United States Patent Office 3,106,855
Patented Oct. 15, 1963

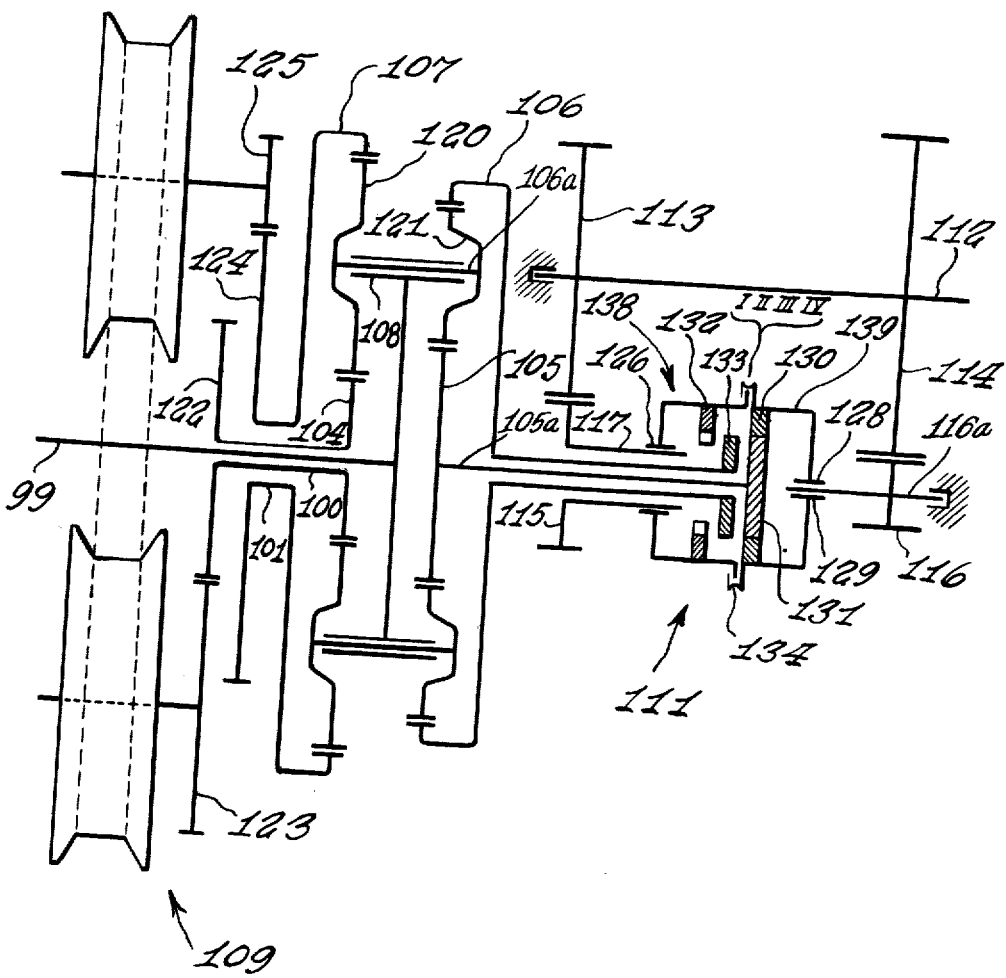

3,106,855
BRANCHED DRIVES
Hans Reichenbaecher, deceased, late of Osnabruck, Germany, by Artur Tietze, administrator, Weissenburger Strasse 15, Osnabruck, Germany
Continuation of application Ser. No. 672,535, July 1, 1957, which is a division of application Ser. No. 379,221, Sept. 9, 1953. This application Aug. 25, 1960, Ser. No. 51,999
14 Claims. (Cl. 74—705)

This invention relates to multi-stage plural path drives or transmissions, and more particularly to such a transmission employing a split path drive. It comprises balancing drives (differential gearing) and one or more controllable transformers, or variable speed drives, in combination and mutually interacting therewith. The controllable power transformers may comprise, for example, Foettinger couplings, hydrodynamic converters, hydrostatic drives, or so-called "variators," or may comprise mechanical step-by-step (e.g. ratchet type) or infinitely variable friction drives. Split path drives with power transformers are utilized, for example, as transmissions, continuously variable or controllable in fine steps at constant power or constant output torque, for motor vehicles, machine tools, cranes, road machinery, etc.

The present application is a continuation of the application of Hans Reichenbaecher, entitled "Branched Drives," Serial No. 672,535, filed July 1, 1957, now abandoned, which, in turn, is a division of Hans Reichenbaecher patent application Serial No. 379,221 filed September 9, 1953, now abandoned.

The principle of power splitting is known and has lead to various types of drives which, however, do not satisfy all requirements. Such prior power split drives are, for example, too heavy or unsuitable for handling large power outputs, or have unsatisfactory efficiency. In the known power split drives the power is introduced through driving means and is split into two split path drives, one of which is passed through the variable speed drive and the other of which is carried through directly without passing through the variable drive. Both split path drives are combined in a balancing gear for the power output. The input drive, the split path drives and the output drive may be considered as power paths, so that the prior art split path drives may be characterized as three path drives.

By way of explanation, for example, the usual rear axle balancing drive (differential gearing) of motor vehicles is a split power drive with three power paths. One power path is the shaft coming from the engine, the second power path is the shaft of the right hand gear of the differential, and the third power path is the shaft of the left hand gear of the differential. Three power path drives of this kind are utilized in the known split path drives by employing one power path as the input, the second power path as the output and the third power path as the connector with the variable speed drive. The other side of the variable speed drive is connected with the power path for the input or output of the compound drive, either directly or with the interposition of step-up or reducing gearing.

Through the split path drives of such transmissions it is the intention to reduce the effect of the lower efficiency of the variable speed drive in order to increase the overall efficiency of the drive and to provide a relatively light and inexpensive construction in place of heavier and more expensive devices. This is intended to be accomplished by directing only part of the power through the variable speed drive while directing most of the power through the step-up or reducing gearing.

Prior art split path drives have unfortunately not accomplished the objectives because the proportion of power which passes through the variable speed drive is disadvantageously great and frequently reaches unity, or even exceeds unity, so that the relative inefficiency of the variable speed drive contributes to overall inefficiency. At the same time, the variable speed drive must be constructed to handle the large proportion of power passing through it.

It is an object of the present invention to overcome these drawbacks of the prior art split path drives. The invention relates to split path drives incorporating more than three power paths with the power paths interconnected in pairs through variable speed drive devices. According to the invention, one of the power paths is formed by a planet gear carrier and other power paths are formed through planetary gearing, sun gears and ring gears, for example, which act in conjunction with planet gears. The various power paths are combined for the power output of the drive.

According to the purposes which the drive is to serve, one or more variable speed drives are provided and the power input or output of the variable speed drives takes place through common or through separate power paths. In some instances the invention utilizes reducing or step-up gearing in one or more power paths to or from the variable speed drive, and, if desired, the planet gears may be rigidly coupled with one another. The power input and power output of the split path drives according to this invention are mutually interchangeable. These split path drives may be combined with each other or with other drives to form multi-stage transmissions in which the control range of the variable speed drive or drives is passed several times.

More specifically, the invention relates to multi-path drives including a variable speed drive. One embodiment of the invention may include a power path serving as the input of the composite drive, a second power path serving as the output, a third power path serving as the input of a variable speed drive, and a fourth power path serving as the output of the variable speed drive. The variable speed drive connects two of the power paths to each other in such a manner that the proportion of power carried through the variable speed drive is reduced considerably as compared with prior art power split drives. In the form of the invention which is the simplest to manufacture, three power paths are formed through ring gears or sun gears, each of which engages planet gearing on a planet gear carrier. A fourth power path is provided by the planet carrier itself.

Split path drives incorporating five or more power paths are ordinarily four power path drives similar to that described above with additional power paths which come into operation only after ratio changing.

The basic concepts of the invention may be accomplished in various ways. In order to more fully explain the foregoing general statements, reference is made to the following drawing, which is by way of example only.

The single figure of the drawing diagrammatically illustrates one embodiment of the split power drive according to the present invention.

According to the single figure of the drawing, the split path drive proper comprises gears and input shafts 99 and gearing 101 comprising sun gears 104, 105, ring gears 106 and 107, planetary gears 120, 121, the input shaft 99 driving planetoid carrier 108. The shaft 100 leads direct to the variable speed drive 109. The output shaft 112 is driven alternately through the gears 105 and 106.

The four speeds I, II, III, IV, are changed over by means of the twin tooth clutch 111. The left-hand element 138 of the clutch 111 is mounted on the hollow shaft 117 of the gear wheel 115 so as to be longitudinally displaceable on but prevented from rotating relative to this shaft by splines 126, and the right-hand element 139 is similarly mounted on the shaft of the wheel 116 by splines 128, 129. The two elements are rotatable relative to each other. In the longitudinal direction they are jointly displaced by a gear-changing fork or shifter 134 or some other known changing element which may act mechanically, hydraulically, or electrically.

In "speed I" position the flow of power passes from the gear 106 through the right-hand element of clutch 111 and through the high-speed transmission of the ordinary output transmission gear formed by gear wheels 116 and 114 to the output 112. While the gear 106 increases its rate of revolution, the rate of revolution of gear 105 drops. When the two gears 105 and 106 run at equal speed, the clutch 111 is shifted to the illustrated position for "speed II." The variable speed transmission 109 once more passes through its control range. Now the rate of rotation of the gear 105 increases and that of gear 106 drops. The speed of the left-hand clutch element 138 is now stepped-up through the output transmission gear. When this clutch element has gained equal speed with gear 106, change-over to "speed III" is effected. Now the operation repeats itself as before but with the output transmitted through the lower-ratio transmission constituted by the gears 115 and 113 of the output gear. Execution with more than two stages can be carried out in such a manner that for each additional stage an additional path is provided in the branch-forming epicyclic gear or that the third, fourth and sixth stages etc. are produced by alternately coupling the fourth and fifth paths with the output gear drive and the output. Throughout, only four path drives are in operation at the same time in the split-path drive-forming epicyclic gear.

A combination of the known split-path drive formation with that according to the invention is also possible by employing in one stage a four-path drive which in some other stage is converted into a three-path drive by coupling two paths.

The example shows that the execution of the principle of the four paths allows a great number of variants. One of the fourth paths is the bridge or planetoid carrier. The other paths may be externally toothed sun gears or internally toothed ring gears. The sun gears and ring gears may engage separate or common groups of planetoid gears. Moreover, four-path drives may be formed from the known three-path drives. Two paths, of two three-path drives respectively are coupled with each other so that out of the total of six paths four free paths are left, which are employed in the illustrated manner, namely two paths respectively, as the input and the output of the total drive and two paths as input and as output respectively of the transformer.

Only spur gear balancing drives have been described and illustrated, but it is known and has been mentioned above that the same effect may be obtained with bevel-gear differential drives. It is further known that in the place of positive couplings there may be employed in multi-stage drives force-determined couplings (mechanically, hydraulically or electrically operated, plate, cone or face clutches, electromagnetic clutches, magnetic powder clutches etc.).

In order to make more certain that the principles of the invention are fully understood, the following is a more detailed description of the single FIGURE of the drawing:

The power split transmission of the present invention comprises an input or drive shaft 99 driving a planet gear carrier 108 which, in turn, rotatably carries a plurality of planet gears 120 (only two shown) and a plurality of planet gears 121 (only two shown), with the planet gears 120 being larger in diameter than the planet gears 121. The planet gears 120 and 121 are coupled in pairs for common rotation on respective shafts rotatably carried by the carrier 108. The planet gears 120 are meshed with sun gear 104 which is carried by a sleeve shaft 100 rotatably disposed about the input shaft 99. The planets 120 are also meshed with a ring gear 107 which is secured to a sleeve shaft 101 rotatably disposed about the sleeve shaft 100. The planet gears 121 are meshed with a sun gear 105 which is carried by a shaft 105a axially aligned with the input shaft 99. A ring gear 106 also meshes with the planet gears 121 and is carried by a sleeve shaft 106a rotatably disposed about the shaft 105a. It will be seen that the planetary gearing, including the sun gears 104 and 105, the ring gears 106 and 107, and the carrier 108, constitutes differential or balance gearing with the ring gear 106 and the sun gear 105 comprising differential output gears.

The power split transmission also includes a variable speed drive unit 109 of any suitable construction for providing infinitely variable or multi-stepped drive ratios between two elements. The variable speed drive may comprise, for example, a hydraulic coupling or torque converter, an infinitely variable ratio friction drive, a magnetic clutch, or any variable speed unit for providing a range of drive ratios between a drive element and a driven element. One element of the variable speed drive 109 may be referred to as the driven element and is connected for driving the ring gear 107 in any suitable manner, for example through a coupled gear member 125 meshing with a gear 124 secured to the sleeve shaft 101. The other element of the variable speed drive may be referred to as the drive element and is connected in any suitable manner being driven by the input shaft 99, through the sun gear 104, for example. This other element of the variable speed drive is coupled to a gear 123 meshed with a gear 122 secured to the sleeve shaft 100. It will be seen that the elements of the variable speed drive provide an infinitely variable drive ratio between the sun gear 104 and the ring gear 107, with the drive ratio varying in accordance with the ratio through the variable speed drive.

The transmission includes an output or driven shaft 112 which is adapted for being driven alternately by the sun gear 105 or the ring gear 106 through a suitable coupling or clutch mechanism 111. The output shaft 112 may be positioned as a countershaft, as shown, with axially spaced countershaft gears 113 and 114 of different sizes fixedly secured thereto. The countershaft gear 113 is of smaller diameter and meshes with a gear 115 carried by a sleeve shaft 117 rotatably disposed about the sleeve shaft 106a. The countershaft gear 114 meshes with a smaller diameter gear 116 mounted on a shaft 116a axially aligned with the sleeve shaft 117. Because of the differences in gear size it will be seen that the drive through the meshing gears 114 and 116 is of lower overall speed ratio and greater torque ratio than the drive through the meshing gears 113 and 115.

The clutch mechanism 111 includes a left hand portion 138 which is axially slidably and non-rotatably splined, through splines 126, on the sleeve shaft 117. A right hand portion 139 of the clutch 111 is axially slidably and non-rotatably splined to the shaft 116a through splines 128 and 129. The two clutch mechanism portions 138 and 139 are rotatably secured to one another and are adapted for being simultaneously axially shifted through a shifter rim 134 connected to any suitable gear changing mechanism (not shown) adapted for shifting the clutch mechanism mechanically, hydraulically or electrically. Suitable positive engagement clutch elements 130 and 132 are fixedly secured in spaced relation within the respective clutch portions 139 and 138. Respective positive engagement clutch elements 131 and 133 are fixedly secured to the shafts 105a and 106a and are adapted for selectively engaging with the clutch elements 130 and 132. The clutch mechanism 111 may be shifted to any one of four positions shown, I, II, III and IV, in which one of the clutch elements 131 or 133 is positively engaged with one of the clutch elements 130 or 132.

In the "speed I" position, the clutch elements 130 and 133 are engaged so that power passes from the ring gear 106 through the shaft 106a, through the right-hand clutch portion 139, through the shaft 116a and the gear 116 and, in turn, through the countershaft gear 114 which drives the output shaft 112. This provides the lowest speed ratio or highest torque ratio drive through the transmission.

In the "speed II" position, the clutch element 130 is disengaged from the clutch element 133 and is brought into engagement with the clutch element 131 so that power passes from the sun gear 105 through the shaft 105a, through the right-hand clutch portion 139, through the shaft 116a and the gear 116, and through the countershaft gear 114 which drives the output shaft 112 at an increased speed. This provides the next higher speed ratio drive.

In the "speed III" position, the other clutch elements are disengaged and the clutch element 132 positively engages the clutch element 133 so that power again flows from the ring gear 106 through the shaft 106a but now passes through the left-hand clutch portion 138, through the sleeve shaft 117 and the gear 115, and through the countershaft gear 113 which now drives the output shaft 112 at a further increased speed due to the difference in countershaft gear ratio. This provides the next-to-highest speed ratio drive.

In the "speed IV" position, the clutch element 132 is disengaged from the element 133 and positively engages the clutch element 131 so that power flows from the sun gear 105 through the shaft 105a, through the clutch element 138 which drives the sleeve shaft 117, and through the gear 115 meshing with the countershaft gear 113 to drive the output shaft 112 at an even greater speed. This provides the highest speed ratio or lowest torque ratio drive.

As indicated earlier, the particular construction of the variable speed drive 109 and the gearing for transmitting power between the variable speed drive and the gears 104 and 107 is unimportant for purposes of this invention. Any type of variable speed drive and gearing can be utilized in order to provide a plurality of speed ratio steps between the gears 104 and 107, preferably an infinitely variable speed ratio. However, it is important to note that at the highest speed ratio drive of the variable speed drive and gearing, the construction and arrangement are such that the gears 104 and 107 are rotating at the same speed so that the gears 105 and 106 are synchronized. At the lowest speed ratio drive, the gears 104 and 107 are rotating at considerably different speeds depending upon the gearing ratio, but the gears 106 and 115 are synchronized when the drive is through the low speed ratio countershaft gearing 114 and 116.

In operation of the power split transmission of this invention, the input shaft 99 is first coupled to a driving engine (not shown) in any convenient manner, for example through a friction clutch (not shown), with the clutch mechanism 111 in the "speed I" position. This causes the carrier 108 to be driven which, in turn, drives the ring gear 106 in the same direction at an underdrive. Initially, the variable speed drive 109 is in its lowest speed ratio drive condition at which time the ring gear 107 is stationary or is being driven at slow speed and the sun gear 104 is being driven in the same direction as the input shaft 99 at an overdrive ratio. As the speed ratio through the variable speed drive 109 is increased, the ring gear 107 begins to rotate at an increasing speed and the sun gear 104 begins to slow down (assuming a constant input shaft speed). At the same time the ring gear 106 rotates at an increasing speed, driving the clutch portion 139, the gear 116, the low speed ratio countershaft gear 114 and the output shaft 112 at an increasing speed. At the maximum speed ratio through the variable speed drive the gears 104 and 107 are synchronized and rotate at the same speed in the same direction as the input shaft 99.

As the ring gear 106 increases in speed, the speed of rotation of the sun gear 105 decreases, and when the gears 104 and 107 reach synchronized speed, at maximum speed drive of the variable drive 109, the ring gear 106 and the sun gear 105 also reach synchronized speed. The shafts 105a and 106a are thus synchronized, and the clutch mechanism 111 is shifted to the "speed II" position. Since the shafts are synchronized in speed, the clutch element 130 moves from its engagement with the element 133 into engagement with the element 131 without any clashing. At this point the output shaft torque resistance is transferred to the sun gear 105.

After the clutch mechanism has been shifted to the "speed II" position, the variable speed drive 109 is passed through its control range in the decreasing speed ratio direction. As the ring gear 107 decreases and the sun gear 104 increases in speed, the speed of rotation of the sun gear 105 is again increased causing an increase in speed of the output shaft 112 through the meshing gears 114 and 116. At the same time the gear 115 and the clutch portion 138 are increased in speed due to the increase in speed of the output shaft. The speed of the ring gear 106 decreases and at the lowest speed drive of the variable drive 109 it is rotating at the same speed as the gear 115. Accordingly, the clutch elements 132 and 133 are synchronized and the clutch mechanism 111 is shifted to the "speed III" position engaging these clutch elements 132 and 133.

With the clutch mechanism in its "speed III" condition, the variable speed drive 109 is again passed through its control range in the increasing speed ratio direction which again increases the speed of rotation of the ring gear 106. This further increases the speed of rotation of the output shaft 112 through the high speed ratio gears 115 and 113. When the variable speed drive 109 has reached its maximum speed ratio, the sun gear 104 and the ring gear 107 are again synchronized in speed resulting in synchronization of the ring gear 106 and the sun gear 105. At this point the clutch mechanism 111 is again shifted, this time to the "speed IV" position engaging the clutch element 132 with the clutch element 131, thus coupling the sun gear 105 with the output shaft 112 through the high speed ratio countershaft gearing.

In the "speed IV" range the variable speed drive 109 is again passed through its control range in the decreasing speed ratio direction until it reaches its lowest ratio thus causing the sun gear 105 to increase in speed to further increase the speed of rotation of the output shaft 112. At the end of the "speed IV" range very little or perhaps no power is being transmitted through the variable speed drive 109, so that the overall efficiency of the transmission is at a maximum.

It will be seen that the sun gear 104 and the ring gear 107 might be referred to as "synchronizing" or "control" members of the differential gearing, in that they cause or control synchronization of the output differential ring gear 106 and the output differential sun gear 105 when they themselves are synchronized in speed. Furthermore, these "synchronizing" members cause or control synchronization of additional driven elements, the positive engagement clutch elements 132 and 133, when they are driven at a predetermined ratio (at the lowest speed drive of the variable speed drive 109).

The transmission passes through two stages to achieve the four speed ranges. In the first stage the variable speed drive passes from its lowest ratio to its highest ratio in the "speed I" range and then passes from its highest ratio to its lowest ratio in the "speed II" range. In both ranges of the first stage the drive is through the low ratio countershaft gearing 114 and 116. In both ranges of the second stage the drive is passed through the high ratio countershaft gearing 113 and 115 with the shift between stages occurring at synchronization of the gear 115 with the ring gear 106. In the second stage the variable speed drive 109 is again passed through its control range in the increasing ratio direction through the "speed III" range and then back down in the "speed IV" range.

Additional stages may be provided through additional step-up gearing or by providing additional power paths in the planetary gearing for driving through the existing countershaft gearing. In every instance, however, only four drive paths are in operation at the same time. In the specific embodiment described they are a first path comprising the input shaft 99 and the carrier 103, a second path comprising the sun gear 104 and associated gearing constituting the variable drive input, a third path comprising the ring gear 107 and associated gearing constituting the variable drive output, and a fourth path comprising an additional element of the planetary gearing, either the ring gear 106 or the sun gear 105, together with the remaining gearing to the output shaft. Of course, the power paths could be provided through other combinations of the elements of the planetary gearing.

From the foregoing description it will be understood that the efficient construction of this invention is achieved by splitting the power flow from an input member and passing a portion of the power through a variable speed drive mechanism of any suitable construction, whereby, in the low range of any drive stage the variable speed drive is operating in its increasing ratio direction, while in the higher range of the stage the variable speed drive mechanism is operating in its decreasing ratio direction. This is accomplished through balance or differential gearing of any suitable type, such as the differential planetary gearing described, arranged in such a manner that speed ratio change takes place when portions of the balance gearing are synchronized. Of course, it will be understood that, in place of the positive clutch means illustrated and described, any other type of mechanical, friction, hydraulic, electrical or other types of clutches can be utilized.

Variations and modifications may be effected without departing from the scope of the novel concepts of the present invention.

What is claimed is:

1. In a variable speed power transmission, input and output shafts, a planetary gear set operatively connected to the input shaft and comprising a first ring gear having internal teeth formed on the periphery thereof and a second ring gear, a first sun gear and a second sun gear, a first planet gear and a second planet gear mounted on a common planet carrier, said planet gears interposed between and in driving engagement with the first sun gear and ring gear and said second sun gear and ring gear respectively, said planet carrier drivingly connected to said input shaft, a first intermediate shaft and a second intermediate shaft operatively connected to said gear set, both coaxial with said input shaft, said second intermediate shaft being rotatably mounted upon said first intermediate shaft, said second sun gear being fixed to said first intermediate shaft, said second ring gear being fixed to said second intermediate shaft, a variable speed unit drivingly associated with said planetary gear set, and change speed means for selectively drivably connecting said one or the other of said intermediate shafts to said output shafts.

2. In a transmission according to claim 1, wherein said change speed means is a ratio drive means selectively connecting said intermediate shafts with said output shafts.

3. In a transmission according to claim 2, said change speed means comprising a first spur gear, rotatably mounted upon said second intermediate shaft, a second spur gear coaxial with said first intermediate shaft, third and fourth spur gears of different diameters fixedly mounted upon said output shaft and in mesh with said first and second gears respectively and clutch means for selectively connecting said first and second intermediate shaft to said first and second spur gears, whereby four speed ranges are obtained by selective engagement of said clutch means and wherein additional speeds may be obtained by regulation of said variable speed unit.

4. A plural path drive transmission comprising a drive shaft, a driven shaft, a first intermediate output member, a second intermediate output member, means for alternately drivingly coupling said intermediate output members with said driven shaft, gearing means adapted for being driven by said drive shaft and drivingly engaging both of said intermediate output members, said gearing means including a rotatable control member, and a variable speed drive unit driven by said drive shaft and drivingly connected to said control member, means for drivingly coupling said first output member to said driven shaft whereby a change of the drive ratio of said variable speed drive unit in one direction increases the speed of said control member to increase the speed of said first output member and to increase the speed of said driven shaft relative to said drive shaft, and means for drivingly coupling said second output member to said driven shaft whereby a change of the drive ratio of said variable speed drive unit in the other direction decreases the speed of said control member to increase the speed of said second output member and to further increase the speed of said driven shaft relative to said drive shaft.

5. A plural path drive transmission comprising a drive shaft, a driven shaft, differential gearing including a pair of output members adapted for being alternately drivingly coupled to said driven shaft, a variable speed drive unit adapted for being driven by said drive shaft and drivingly associated with said differential gearing, and means for drivingly connecting said drive shaft with said differential gearing, whereby said drive shaft drives said driven shaft through both said variable speed drive unit and said differential gearing, and whereby one speed ratio range is provided between said shafts when one of said output members is drivingly coupled to said driven shaft and another speed ratio range is provided between said shafts when the other of said output members is coupled to said driven shaft.

6. A plural path drive transmission comprising a drive shaft, a driven shaft, differential gearing, a variable speed drive drivingly associated with said drive shaft and said differental gearing, direct drive means drivingly disposed between said drive shaft and said differential gearing, means for drivingly connecting said differential gearing with said driven shaft to provide one drive ratio range for increasing the speed of said driven shaft relative to the speed of said drive shaft when the drive ratio in said variable speed drive is increased, and means for drivingly connecting said differential gearing with said driven shaft to provide another drive ratio range for increasing the speed of said driven shaft relative to said drive shaft when the drive ratio in said variable speed drive is decreased.

7. A plural path drive transmission comprising a drive shaft, a driven shaft, differential gearing, a variable speed drive drivingly associated with said differential gearing, means drivingly coupling said drive shaft with said differential gearing and said variable speed drive to provide separate power paths, means for drivingly coupling said differential gearing to said driven shaft to increase the drive speed ratio between said shafts when the drive ratio through said variable speed drive is increased, and means for drivingly coupling said differential gearing to said driven shaft to increase the drive speed radio between the shafts when the drive ratio through said variable speed drive is decreased.

8. A plural path drive transmission comprising a drive shaft, a driven shaft, differential gearing, a variable speed drive, and means for drivingly coupling said differential gearing and said variable speed drive with said shafts to provide a first drive range for increasing the drive speed ratio between the shafts when the drive ratio through said variable speed drive is changed in one direction, and means for drivingly coupling said differential gearing and said variable speed drive with said shafts to provide a second drive range for increasing the drive speed ratio between the shafts when the drive ratio through the variable speed drive is changed in the other direction.

9. A transmission according to claim 8 wherein said differential gearing includes a pair of intermediate output members, and said coupling means includes clutch mechanism for alternately drivingly coupling said intermediate output members with said driven shaft to provide said first and second drive ranges.

10. A plural path drive transmission comprising a drive shaft, a driven shaft, a compound planetary gear set including a plurality of rotatable elements, a variable speed drive drivingly associated with said drive shaft, means securing a first one of said rotatable elements with said drive shaft, means drivingly coupling a second one of said rotatable elements with the output of said variable speed drive, and means for alternately drivingly coupling third and fourth ones of said rotatable elements to said driven shaft whereby a low speed ratio range is provided for increasing the speed of said driven shaft relative to said drive when said variable speed drive is increased in drive ratio with said third rotatable element drivingly coupled to the driven shaft, and whereby a high speed ratio range is provided to further increase the speed of said driven shaft relative to said drive shaft when said variable speed drive is decreased in drive ratio with said fourth rotatable element coupled to the driven shaft.

11. A plural path drive transmission comprising a drive shaft, a driven shaft, a compound planetary gear set including a rotatable carrier element rotatably carrying a pair of coupled planet elements of different diameter, said planetary gear set also including two rotatable gear elements meshed with one of said planet elements and another rotatable gear element mashed with the other of said planet elements, a variable speed drive drivingly associated with said drive shaft, means coupling the output of said variable speed drive to one of said gear set elements, means coupling said drive shaft to a second of said gear set elements, mechanism for alternately drivingly coupling a third and fourth of said gear set elements with said driven shaft to provide a first drive range for increasing the drive speed ratio between said shafts when the drive ratio through said variable speed drive is increased with the third of said gear set elements drivingly coupled to said driven shaft and to provide a second drive range for further increasing the drive speed ratio between said shafts when the drive ratio through the variable speed drive is decreased with the fourth of said gear set elements drivingly coupled to the driven shaft.

12. A plural path drive transmission comprising a drive shaft, a driven shaft, a first intermediate output member, a second intermediate output member, means for alternately drivingly coupling said intermediate output members with said driven shaft, gearing means adapted for being driven by said drive shaft and drivingly engaging both of said intermediate output members, a variable speed drive drivingly asociated with said drive shaft, said gearing means including a rotatable synchronizing member driven by the output of said variable speed drive, whereby a low speed drive range is provided to increase the speed of said driven shaft relative to said drive shaft when the drive ratio through said variable speed drive is increased with said first intermediate output member drivingly coupled with said driven shaft, and whereby a high speed drive range is provided to further increase the speed of said driven shaft relative to said shaft when the drive ratio through said variable speed drive is decreased with said second intermediate output member drivingly coupled with said driven shaft.

13. A plural path drive transmission comprising a drive shaft, a driven shaft, differential gearing including a pair of output members and a relatively rotatable synchronizing member, means drivingly coupling said drive shaft with said differential gearing, a variable speed drive adapted for being driven by said drive shaft and having its output coupled to said synchronizing member, coupling means for drivingly coupling said first output member to said driven shaft whereby increase in drive ratio through said variable speed drive increases the speed of rotation of said synchronizing member to synchronize the speed of rotation of said first and second output members while increasing the speed of rotation of said driven shaft, and means for shifting said coupling means to disengage said first output member and to drivingly couple said second output member with said driven shaft when the output members are synchronized whereby decrease in the drive ratio through said variable drive decreases the speed of rotation of said synchronizing member and increases the speed of rotation of said second output member to further increase the speed of rotation of said driven shaft.

14. A plural path drive transmission comprising a drive shaft, a driven shaft, differential gearing drivingly associated with said drive shaft and including a pair of rotatable output members, a variable speed drive drivingly associated with said drive shaft, means drivingly coupling the output of said variable speed drive with said differential gearing whereby said output members are rotated at substantially different speeds at the lowest drive speed ratio through said variable speed drive and whereby said output members are synchronized in speed at the highest drive speed ratio through said variable speed drive, means alternately drivingly coupling said output members with said driven shaft and adapted for changing between said output members only when the output members are synchronized in speed at the highest speed drive ratio through said variable speed drive, whereby a low speed drive range is provided to increase the speed of said driven shaft relative to said drive shaft and said variable speed drive is increased in ratio and whereby a high speed ratio range is provided to further increase the speed of said driven shaft relative to said drive shaft when said variable speed drive is decreased in drive ratio.

References Cited in the file of this patent
UNITED STATES PATENTS
2,410,333    Barkeij _____ Oct. 29, 1946

UNITED STATES PATENT OFFICE
CERTIFICATE OF CORRECTION

Patent No. 3,106,855                        October 15, 1963

Hans Reichenbaecher, deceased, by Artur Tietze, administrator

It is hereby certified that error appears in the above numbered patent requiring correction and that the said Letters Patent should read as corrected below.

Column 9, line 22, after "drive", first occurrence, insert -- shaft --; column 9, line 35, for "mashed" read -- meshed --; column 10, line 8, after "said", second occurrence, insert -- drive --; line 29, after "variable" insert -- speed --.

Signed and sealed this 30th day of June 1964.

(SEAL)
Attest:

ERNEST W. SWIDER                                      EDWARD J. BRENNER
Attesting Officer                                           Commissioner of Patents